United States Patent [19]

Jahnle

[11] 4,431,221
[45] Feb. 14, 1984

[54] BUMPER BEAM FOR AN AUTOMOBILE

[75] Inventor: Herbert A. Jahnle, Havertown, Pa.

[73] Assignee: The Budd Company, Troy, Mich.

[21] Appl. No.: 352,770

[22] Filed: Feb. 26, 1982

[51] Int. Cl.³ .............................................. B60R 19/02
[52] U.S. Cl. .................................... 293/122; 293/132; 188/377
[58] Field of Search ....................... 293/132, 133, 122; 188/377, 371; 280/784, 785

[56] References Cited

U.S. PATENT DOCUMENTS 3,831,997  8/1974  Myers ................................. 293/133

FOREIGN PATENT DOCUMENTS 54-3667  1/1979  Japan ................................. 188/377

Primary Examiner—Robert R. Song
Attorney, Agent, or Firm—Edward M. Farrell; Herman Foster; Thomas I. Davenport

[57] ABSTRACT

A vehicle comprises a main body including a firewall having a pair of side rails connected thereto and extending forwardly therefrom. A front bumper beam is secured to the side frames. The bumper beam comprises an elongated box structure having a pair of tubular elements therein in alignment with the pair of side rails. The tubular elements provide additional crush distance in the event of a frontal collision.

5 Claims, 5 Drawing Figures

U.S. Patent   Feb. 14, 1984   Sheet 1 of 2   4,431,221
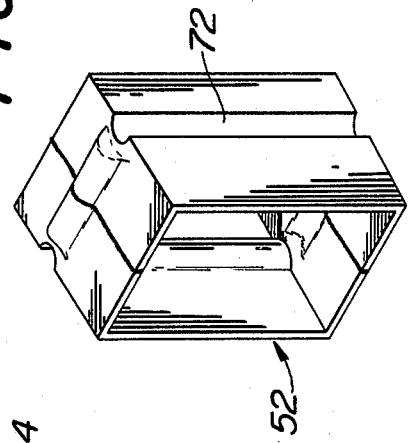

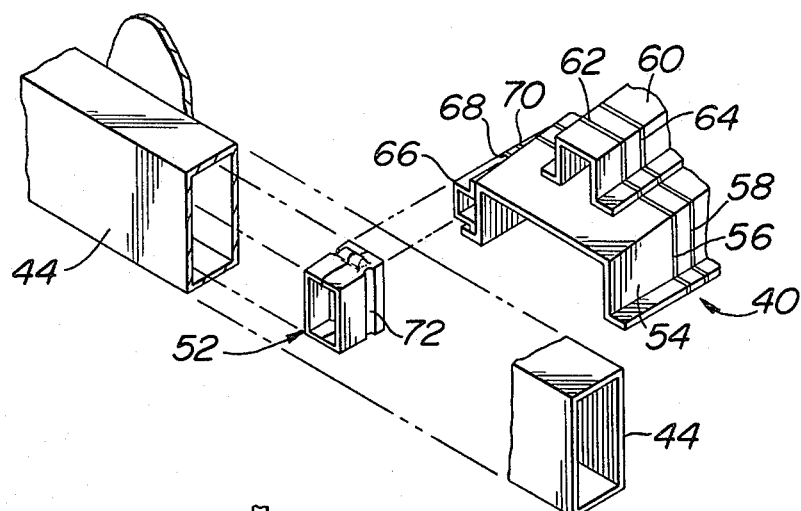
FIG. 3
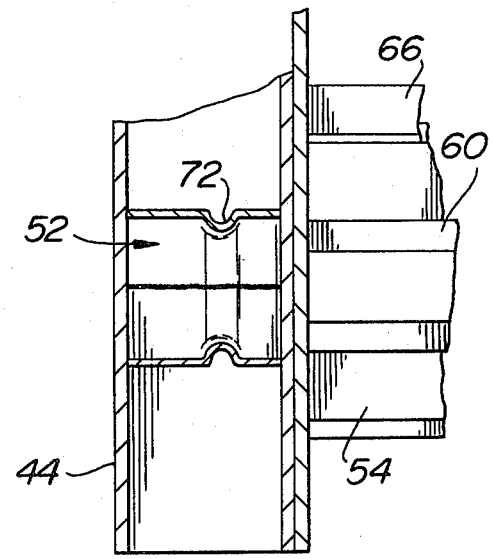
FIG. 4
FIG. 5

BUMPER BEAM FOR AN AUTOMOBILE

BACKGROUND OF THE INVENTION

Energy absorbing devices have taken a wide variety of forms in automobiles. In general, such devices have been connected to the front bumpers to absorb impacts to minimize damage to the main body of the automobile as well as providing protection for the passengers. An automobile involving such energy absorbing devices is described in a copending patent application entitled "Front and Rear Energy Absorbing Structures for a Four Passenger Vehicle", Ser. No. 344,731, filed Feb. 1, 1982, and assigned to the same assignee as the present invention.

In a frontal collision of an automobile, it is desirable to absorb the kinetic energy of the moving vehicle (Kinetic Energy=(w/2 G)V$^2$) over a long crush distance (S) of the frontal structure (Energy absorbed=FS), where w is the weight of the vehicle, g is the gravity and F is the force. This long crush distance is desired to reduce the crush force (F) and the acceleration level, (F=(w/g)a), where a is the acceleration involved.

As an explanatory example, the kinetic energy of a 2000 pound vehicle traveling at a speed of 40 mph (58.7 feet per sec.) is:

$$K.E. = \frac{2000}{64} (3441.8) \; 12$$

$$= 1,291,667 \text{ inch pounds}$$

The maximum desirable acceleration is 36 g's as established by many tests on humans in aircraft and missle systems. This then determines the force level.

$$F = \frac{(2000)}{g} 36 \, g$$

$$= 72000 \text{ Pounds}$$

At this maximum crush force, or crush resistance of the frontal structure, the crush distance will be $$S = \frac{K.E.}{F}$$

$$S = 17.9 \text{ inches}$$

The distance from the firewall to the bumper beam varies from vehicle to vehicle but in subcompact sizes of 2000 pound weight this distance is 36 inches or less. Within this space the engine and other equipment must be mounted. The engine in particular acts as a large uncrushable object and as such reduces the distance for crushing in a collision. An an example, if the engine width is 20 inches then the available crush distance remaining is 36-20 or 16 inches. The available crush distance is 1.9 inches less than the desired crush distance.

Within the front of the vehicle the two front rails (sills), extending from the firewall to the front bumper, provide the major portion of the crush resistance. The front bumper is attached to these two rails in the front.

The front bumper system must withstand a 5 mph impact into a barrier without suffering any permanent damage and the vehicle behind the bumper must also be undamaged. To provide such a bumper system, energy absorbing systems capable of stroking two inches at forces of 10,000 pounds are required. The total depth of such devices are usually 4 inches minimum, consisting of a flexible foam or a thermoplastic (polycarbonate) shell mounted to an aluminum alloy or steel box beam. This box beam is in the order of 2 inches deep to minimize deflections and optimize the weight. The box beam alone will collapse with little or no energy absorption in a frontal collision of 30 mph or greater.

OBJECTS OF THE INVENTION

It is an object of this invention to provide a vehicle with improved frontal crash worthiness.

It is still a further object of this invention to provide an improved bumper for a vehicle in which the energy absorbing characteristics and crush distance is increased in the event of front impacts without increasing the sizes of the components involved.

BRIEF SUMMARY OF THE INVENTION

In accordance with the present invention, a vehicle comprises a main body including a firewall having a pair of side rails connected thereto and extending forwardly therefrom. A front bumper beam is secured to the side frames. The bumper beam comprises an elongated box structure. A pair of tubular elements is disposed inside of said bumper beam in alignment with the pair of side rails. The tubular elements inside the bumper beam provide increased crush force and energy absorbing characteristics. The crush distance of the bumper beam is added to the crush distance of the side rails so as to provide a total greater crush distance in the vehicle making it possible to absorb greater forces in the event of frontal impacts.

Other objects and advantages of the present invention will be apparent and suggest themselves to those skilled in the art, from a reading of the following specification and claims, taken in conjunction with the accompanying drawings, in which:

FIG. 1 is an isometric view of an automobile frame in which the present invention may be used;

FIG. 2 is a view of one of the tubular elements disposed in the bumper beam of the automobile illustrated in FIG. 1;

FIG. 3 is an exploded view illustrating the main elements of the automobile involving the present invention;

FIG. 4 is a cross-sectional view taken along lines 4—4 of FIG. 1; and

FIG. 5 is a cross-sectional view taken along lines 5—5 of FIG. 1.

DETAILED DESCRIPTION OF THE INVENTION

Referring to FIG. 1, a frame 10 of an automobile comprises an upper frame 12 attached to a lower frame or platform 14. The frame 12 includes pairs of "A" posts 16, "B" posts 18 and rear structures 20. Pairs of roof side rails 22 and angular rails 24 join the various posts and structures.

Roof head beams 26 and 28 are connected between the roof side rails 22. A rear door cross-member 30 is connected between the rear structures 20. A pair of rear belt line members 30 connect the "B" posts 18 to the rear structures 20.

The lower frame 14 includes a firewall 32 disposed towards the front of the vehicle frame. A bulkhead 34, which may house a gas tank, is disposed towards the center of the frame. Front and rear floor areas are provided on both sides of the bulkhead 34.

A pair of rearwardly extending side rails 36 is connected between the bulkhead 34 and a rear bumper 38. A pair of forwardly extending side rails 40 and 42 is connected between the firewall 32 and a front bumper 44. The front bumper 44 with its associated elements to be described, along with the forwardly extending side rails 40 and 42, comprise the means towards which the present invention is specifically directed.

Various other features and elements of the frame 10 are described in the aforementioned application and are only incidentally related to the present invention. They will, therefore, not be described in detail.

The engine for the vehicle utilizing the frame 10 would normally be placed in the area within the side walls 40 and 42, the firewall 32 and the front bumper 44. The distance from the firewall 32 and the bumper 44 in many subcompact vehicles of 2000 pounds weight is 36 inches or less. The engine represents an uncrushable object and reduces the distance available for crushing in the event of frontal collision. If the engine width is 20 inches, then the available crush distance remaining is 16 inches. This is 1.9 inches less than the desirable crush distance as discussed previously.

In order to attain the additional crush distance, the present invention utilizes the width of the bumper beam to add on the distance normally available.

Energy absorption for frontal impact is provided by energy absorbing means incorporated in the forwardly extending side rails 40 and 42. The energy absorbing means includes pairs of indentations or deformations 46 and 48 in the side rails 42 and 40, respectively.

As will be described in connection with FIG. 3, the side rails 40 and 42 each include three pieces for added strength, with each of the three pieces including deformations, which maybe considered as creases or failures in the column which are extended around the portions of the side rails being crushed.

The side rails 40 and 42 extend horizontally in essentially straight lines from firewall 32 at the front of the vehicle frame where it is connected to the front bumper 44. The straight line arrangement prevents bending away from the structure when the vehicle strikes a barrier and permits an orderly collapse of the structure as the energy is absorbed when striking the barrier. In order to make certain that there are no initial high peak loads when the barrier is struck by the vehicle and to fix the areas at which the collapses should start, the deformations 46 and 48 are designed in the front side rails 40 and 42 in the manner illustrated.

Referring to FIGS. 2–5, along with FIG. 1, the bumper 44 comprises an elongated beam having a rectangular tubular box-like shape. A pair of relatively short tubular elements 50 and 52 are disposed within the open area of the bumper 44 in alignment with the front side rails 40 and 42, respectively. The open areas of the tubular elements 50 and 52 are disposed perpendicularly with the open area of the tubular beam comprising the bumper 44.

Without the tubular elements 50 and 52, the bumper 44 would normally collapse with little or no energy absorption in a frontal collision of 30 miles per hour or greater. The insertion of the tubular elements 50 and 52 inside of the box beam directly in front of the front side rails increases the energy absorbing characteristics. The distance equal to the width of the bumper is in effect added to the crush distance available, for example, increasing it from 16 to 18 inches when the bumper is two inches deep.

The forwardly extending side rails 40 and 42 are each made up of a plurality of similar pieces, with the pieces of the side rail 40 being illustrated in FIG. 3. The side rail 40 comprises a main channel 54 with indentations 56 and 58, a top channel 60 with indentations 62 and 64, and a side channel 66 with indentations 68 and 70. Similar indentations and elements are included in the side rail 42. The various indentations are those generally referred to as indentations 48 illustrated in FIG. 1. The indentations in channels 54, 60 and 66 extend between opposite edges thereof.

The tubular element 52, similar to the element 50, comprises a metallic piece having an indentation or bend 72 extending completely around its periphery 52. The tubular elements 50 and 52 are in alignment with the side rails 40 and 42, generally with the side channels thereof, of which one side channel 66 is illustrated in FIG. 3.

As described, the indentations in the side rails 40 and 42 provide weak areas in the structures and control the areas at which collapses take place upon impact. The alignment of the side rails assure an orderly collapse.

The indentations in the tubular elements 50 and 52 also determine the areas of collapse. In effect the elements 50 and 52 start to collapse upon front impact with the bumper 44, with the collapse continuing with the collapse of the side rails 40 and 42. With respect to the collapsing operation, the elements 50 and 52 may be considered as continuations of the side rails 40 and 42. However, additional collapsing distance is achieved with no basic change to the dimensions of the vehicle frame or to the exterior appearance of the vehicle involved. Only a minimal amount of weight is added to the vehicle frame by the elements 50 and 52.

What is claimed is:

1. A main frame for a vehicle comprising:
   (a) a firewall;
   (b) a pair of side rails connected to and extending forwardly from said side wall;
   (c) a front bumper beam secured to the ends of said side frames;
   (d) said bumper beam comprising an elongated open box structure;
   (e) a pair of tubular elements disposed inside of said bumper beam in alignment with said pair of side rails; and
   (f) said pair of tubular elements including indentations around their peripheries to control the areas of collapse upon impact.

2. A main frame as set forth in claim 1 wherein the open areas of said tubular elements are aligned perpendicularly with respect to the open area in said open box structure comprising said bumper beam.

3. A main frame as set forth in claim 2 wherein said pair of side rails include indentations therein in alignment with the indentations in said tubular elements.

4. A main frame as set forth in claim 3 wherein the indentations in said pair of side rails are disposed forwardly towards the ends thereof in close proximity to said bumper beam to control the areas of collapse therein.

5. A main frame as set forth in claim 4 wherein said pair of side rails comprise a plurality of channel members secured together and having indentations therein with the indentations in each said tubular elements being aligned with one of said plurality of channel members.

* * * * *